US005606599A

United States Patent [19]
O'Mahony et al.

[11] Patent Number: 5,606,599
[45] Date of Patent: Feb. 25, 1997

[54] METHOD AND APPARATUS FOR AUTOMATICALLY CONVERTING FROM AN ANALOG VOICE MODE TO A SIMULTANEOUS VOICE AND DATA MODE FOR A MULTI-MODAL CALL OVER A TELEPHONE LINE

[75] Inventors: Barry O'Mahony, Banks; Narjala Bhasker, Portland, both of Oreg.

[73] Assignee: Intel Corporation, Santa Clara, Calif.

[21] Appl. No.: 265,314

[22] Filed: Jun. 24, 1994

[51] Int. Cl.$^6$ .................................................. H04M 11/00
[52] U.S. Cl. ............................ 379/93; 379/98; 379/88; 379/89
[58] Field of Search ..................... 379/93, 94, 96, 379/97, 98, 100; 348/16, 17; 375/222, 240; 370/125, 58.1, 110.1, 69.1, 32.1, 84; 381/29–31, 106; 333/14

[56] References Cited

U.S. PATENT DOCUMENTS

| | | | |
|---|---|---|---|
| 4,805,208 | 2/1989 | Schwartz | 379/93 |
| 5,086,453 | 2/1992 | Senoo et al. | 379/93 |
| 5,091,877 | 2/1992 | Itoh et al. | 385/200 |
| 5,182,762 | 1/1993 | Shirai et al. | 375/240 |
| 5,200,962 | 4/1993 | Kao et al. | 371/41 |
| 5,250,940 | 10/1993 | Valentaten et al. | 345/189 |
| 5,283,638 | 2/1994 | Engberg et al. | 348/14 |
| 5,325,423 | 6/1994 | Lewis | 379/90 |
| 5,359,644 | 10/1994 | Tanaka et al. | 379/96 |
| 5,365,576 | 11/1994 | Tsumura et al. | 379/93 |
| 5,428,608 | 6/1995 | Freeman et al. | 379/93 |
| 5,440,585 | 8/1995 | Pastridge, III | 375/222 |
| 5,452,289 | 9/1995 | Sharma et al. | 370/32.1 |
| 5,463,616 | 10/1995 | Kruse et al. | 370/24 |
| 5,502,727 | 3/1996 | Catanzaro et al. | 370/84 |

OTHER PUBLICATIONS

Stockford, Paul, "Voice View Offers Voice and Data Over a Single Analog Line", article appearing in Voice Processing Magazine, Jul. 1992.

*Primary Examiner*—Curtis Kuntz
*Assistant Examiner*—Stephen Palan
*Attorney, Agent, or Firm*—Blakely, Sokoloff, Taylor & Zafman

[57] ABSTRACT

An enhanced micro-controller having multiple operating modes, including an idle mode, an analog voice mode, a digital data mode, and a simultaneous voice and data mode, and control logic for establishing multiple logical connections and voice as well as data transmission protocols over these logical connections with another DCE, when switching from the analog voice mode to the simultaneous voice and data mode, is provided to a DCE designed to support multi-modal voice and/or data calls over a single analog-loop telephone line. In one embodiment, the establishment of the voice transmission protocol includes joint negotiation of the voice compression/decompression algorithm to be used by the mode transition initiating and responding DCEs.

18 Claims, 8 Drawing Sheets

VOICE PARAMETERS

| Param ID (PI) | Parameter Description | Parameter Value (PV) |
|---|---|---|
| 0 | Parameter Set Identification | Predetermined Unique Value Denoting SVD Parameter Set |
| 1 | Standard Voice Algorithm | Predetermined Unique Value Denoting A Standard Voice Algorithm |
| 2 | Calling DCE's Manufacturer Specific Voice Algorithm | Predetermined Unique Value Denoting The Manufacturers Voice Algorithm |
| 3 | Answering DCE's Manufacturer Specific Voice Algorithm | Predetermined Unique Value Denoting The Manufacturers Voice Algorithm |
| 4 | Voice Blocking Factor Per HDLC Frame | Numeric Value Denoting Maximum Number Of Voice Frames |
| 5 | Enable Usage Of Frame Sequence Number | Predetermined Setting Denoting "Enabling" |
| 6 | Voice Quality vs Data Rate Preference | Predetermined Setting Denoting Preference |

*Figure 5*

METHOD AND APPARATUS FOR AUTOMATICALLY CONVERTING FROM AN ANALOG VOICE MODE TO A SIMULTANEOUS VOICE AND DATA MODE FOR A MULTI-MODAL CALL OVER A TELEPHONE LINE

BACKGROUND OF THE INVENTION

1. Field of the Invention

The present invention relates to the field of Data Communication. More specifically, the present invention relates to data circuit terminating equipments (DCEs) such as modems for transmitting voice and data over analog-loop telephone lines.

2. Background Information

Current DCEs that support transmission of both voice and data over a single analog-loop telephone line typically implement the support in one of two approaches. Under the first approach, a DCE operates in one of two switchable modes, a voice mode and a data mode, whereas under the second approach, a DCE operates in a single continuous combined voice and data mode.

More specifically, under the first approach, both the calling and answering DCEs start out in the voice mode, where analog voice signals are bypassed from the transmitting telephone coupled to one of the DCEs onto the analog-loop telephone line, and similarly from the analog-loop telephone line to the receiving telephone coupled to the other DCE. While the DCEs are in voice mode, no data are transmitted by the DCEs on behalf of data transmitting equipments (DTEs), such as computers, coupled to the DCEs at both end of the connection. To switch into the data mode, one of the DTEs would cause its DCE to transmit a predetermined signal pattern on its behalf. Upon detection of the predetermined signal pattern, the other DCE would acknowledge. If the acknowledgment is received by the initiating DCE within a predetermined time period, the DCEs would jointly establish a data transmission protocol, enter the data mode, and mute the DCE's voice path. The DTEs can now transmit data to each other through their respective DCEs and over the analog-loop telephone line. At the end of data transmission, the DTE that initiated the mode switching would cause its DCE to transmit another predetermined signal pattern on its behalf, return to the voice mode, and unmute the voice path. Likewise, upon detection of this other predetermined signal pattern, the other DCE would also forward the signal to its DTE, return to the voice mode, and unmute the voice path. Voice signals are once again bypassed from the transmitting telephone onto the telephone line, and from the telephone line to the receiving telephone.

Typically, the data transmission protocol jointly established by the calling and answering DCEs as an integral par of switching from the voice mode to the data mode is a High Level Data Link (HDLC) frame based type protocol.

Under the second approach, the DCEs always operate in a single continuous combined voice and data mode. The DCEs jointly establish a data transmission protocol at star up. The analog voice signals received from the coupled telephones are digitized by the DCEs or forwarded to the coupled DTEs for digitization. The DCEs transmit the digitized voice signals intermixed with the data received from the coupled DTEs. Conversely, the digitized voice signals received from the analog-loop telephone line are converted back into analog voice signals by the DCEs or forwarded to the coupled DTEs for conversion. The DCEs then forward the analog voice signals to the telephones.

Typically, the data transmission protocol jointly established by the calling and answering DCEs as an integral part of the initial start up of the single continuous combined voice and data mode is also a High Level Data Link (HDLC) frame based type of protocol. Except for "marking" the digitized voice to facilitate their identification and conversion back to analog voice signals, the digitized voice are otherwise handled as if they are data.

The first approach has the disadvantage that there is no voice communication between the connected parties during data transmission. Thus, DCEs implementing the first approach are really suitable only for applications where voice communication is unnecessary during data transmission or data transmission is merely required intermittently and for short durations.

The second approach has the disadvantage that the DCEs on both ends of the connection must support continuous combined voice and data mode. Therefore, for applications frequently involving "unacquainted" users, an initial phone call using "standalone" telephones directly coupled to another analog-loop telephone line must be made to establish the fact that such continuous combined voice and data call can be made between two DCE coupled telephones. Thus, DCEs implementing the second approach are really suitable only for applications involving primarily "acquainted" users.

With the continuing increase in the capabilities microprocessor based desktop computers, they are being applied to more and more applications that require simultaneous voice and data communications between two users. A particular example of these applications is personal conferencing where users at different sites cooperate orally and interactively with a shared workspace application on the creation or review of documents. Another example is remote technical support where the support engineers communicate orally with the users as well as interacting remotely with programs executing on the users' systems for diagnostic or demonstration purposes. Due to the disadvantages discussed above, neither types of DCEs serve these applications well. As a result, most users of these applications resort to two telephone lines, with one dedicated for voice communication, and the other dedicated to data communication.

Thus, it is desirable to be able to support multi-modal voice and data communication between two users over a single analog-loop telephone line that is more flexible and user friendly, U.S pat. application, Ser. No. 08/265,455, filed contemporaneously, entitled Method and Apparatus for Making a Multi-Modal Voice and/or Data Call over a single Analog-Loop Telephone Line, discloses such method and apparatus. At least four modes, an idle mode, an analog voice mode, a digital data mode, and a simultaneous voice and data mode are supported in the disclosed method and apparatus.

It is further desirable then to be able to automatically convert from the analog voice mode to the simultaneous voice and data mode, including establishment of voice as well as data transmission protocols, in a flexible and user friendly manner, for making multi-modal voice and/or data call over a single analog-loop telephone line. As will be disclosed in more detail below, the present invention provides for such method and apparatus that advantageously achieves these and other desirable results.

SUMMARY OF THE INVENTION

The present invention advantageously achieves the desired results by providing an otherwise conventional DCE with an enhanced micro-controller having multiple operating modes, including an idle mode, an analog voice mode, a digital data mode, and a simultaneous voice and data (SVD) mode, and control logic for operating in and transitioning the DCE between these operating modes, responsive to local events/commands and remote commands. In particular, the control logic is provided with the capabilities for establishing multiple logical connections with another DCE at the other end of an analog-loop telephone line, and voice as well as data transmission protocols over these logical connections with the other DCE, when switching from the analog voice mode to the SVD mode.

More specifically, the control logic is provided with the capabilities to initiate, or to respond to the initiation by the other DCE for transitioning the DCE from the analog voice mode to the SVD mode. In one embodiment, the control logic initiates the mode transition, responsive to a local "dial" command received, using a predetermined "start up" signal pattern, and responds to the other DCE's initiation for mode transition using a predetermined "confirmation".

Additionally, the control logic is equipped with the capabilities to jointly establish at least two logical connections with the other DCE, one for voice and the other for data, and the voice and data transmission protocols over these logical connections, after "confirmation". In one embodiment, the control logic jointly establish the logical connections and the transmission protocols by establishing a multiple logical channel error-corrected modem connection/protocol in accordance to International Telecommunication Union Technical Standardization Sector's (ITU-T) Recommendation V.42.

Furthermore, the control logic is equipped with the capabilities to jointly negotiate the voice compression/decompression algorithms, and preferably the data compression/decompression algorithms with the other DCE, as an integral part of establishing the multiple logical connections and transmission protocols. In one embodiment, the control logic uses the exchange identification (XID) frames of the V.42 protocol to negotiate and establish the voice compression/decompression algorithms. The control logic negotiates and establishes the data compression/decompression algorithms in accordance to ITU-T's Recommendation V.42bis.

When negotiating the voice compression/decompression algorithm, the control logic of the above described embodiment sets the group identifier of the data link layer subfield of a XID frame to private parameter negotiation, and the first parameter identifier of the parameter field of the data link layer subfield to a predetermined SVD parameter set identifier. The control logic of the mode transition initiating DCE nominates voice compression/decompression algorithms using additional parameters in the parameter field. The control logic of the mode transition initiating DCE may further supply a voice quality versus data rate tradeoff preference as another additional parameter in the parameter field. The control logic of the mode transition responding DCE replies with a parameter identifying the selected voice compression/decompression algorithm, factoring into its selection the voice quality versus data rate tradeoff preference if provided. The control logic of the mode transition initiating DCE then determines the voice blocking factor based on the voice compression/decompression algorithm selected, and informs the mode transition responding DCE.

BRIEF DESCRIPTION OF DRAWINGS

FIG. 5 illustrates exemplary voice parameters employed by one embodiment of the enhanced micro-controllers of the mode transition initiating and responding DCEs for voice compression/decompression algorithm negotiation, when establishing the voice transmission protocol.

DETAILED DESCRIPTION

Figure 1A:
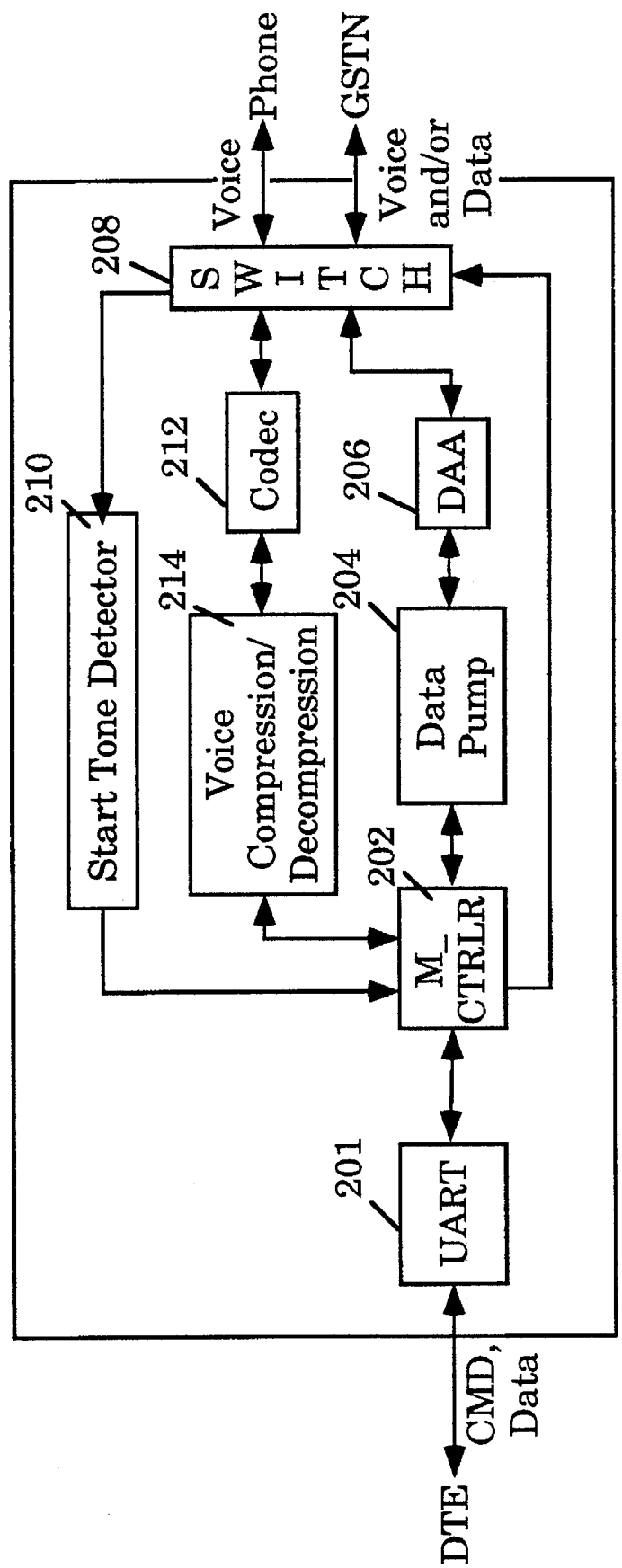
FIGS. 1a–1d illustrate four embodiments of DCEs incorporating teachings of the present invention.

In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention.

Referring now to FIGS. 1a–1d, four block diagrams illustrating four embodiments of DCEs incorporating teachings of the present invention are shown. As illustrated, a DCE 18a, 18b', 18b", 18c' or 18c" in accordance to the present invention comprises an enhanced micro-controller 202 incorporating teachings of the present invention. The DCE 18a, 18b', 18b", 18c' or 18c" further comprises a universal asynchronous receiver/transmitter (UART) 201, a data pump digital signal processor 204, data equipment attachment adapter circuitry (DAA) 206, and predetermined start up signal detection circuitry 210.

Additionally, for the first and second embodiments designed to support standalone telephones, the DCE 18a, 18b', or 18b" further comprises enhanced switching circuitry 208, and analog to digital and digital to analog conversion circuitry (CODEC) 212. For these embodiments, the enhanced switching circuitry 208 includes the conventional "loop current detector" for detecting when the standalone telephone goes off hook an starts drawing loop current, whereas the CODEC 212 includes the conventional "local phone interface" for combining the voice signals with the DC voltage for the telephone. The DCE 18a or 18b' further comprises a "local" voice compression/decompression digital signal processor 214, whereas the DCE 18b" further comprises block transfer circuitry 203. The DCE 18b" relies on the processing engine of the DTE for voice compression/decompression. The DCE 18a or 18b' may be packaged as a separate unit from the DTE or an integral part of the DTE, whereas the DCE 18b" is intended to be packaged as an integral part of the DTE.

For the third and fourth embodiments designed to support integrated telephony circuitry, the data pump digital signal processor 204 of DCE 18c' or 18c" is further provided with the "CODEC" capabilities. The DCE 18c' or 18c" further comprises block transfer circuitry 203. The DCE 18c' further comprises a "local" voice compression/decompression digital signal processor 214, whereas the DCE 18c" relies on the processing engine of the DTE for voice compression/decompression. Both embodiments of the DCE 18c' and 8c" are intended to be packaged as an integral part of the DTE.

The micro-controller 202, as will be described in more details below, operates the DCE 18b', 18b", 18c', and 18c" in at least four modes, transitioning the DCE 18b', 18b", 18c', and 18c" between these operating modes responsive to local events or commands, as well as remote commands as appropriate.

The switching circuitry 208, if used, responsive to the multi-modal micro-controller 202, dynamically configures signal paths for the signals being received or to be transmitted over a coupled analog-telephone line. The signal paths for the embodiments 18c' and 18c" without the switching circuitry are preconfigured. For further description of the switching circuitry 208, see the above identified U.S. patent application, Ser. No. 08/265,455,, which is hereby fully incorporated by reference.

The data pump digital signal processor 204 and the voice compression/decompression digital signal processor 214 are intended to represent a broad category of digital signal processors known in the art. Their constitutions and functions are well known, and will not be further described. Preferably, the data pump digital signal processor 204 is a high performance digital signal processor capable of supporting a transmission rate of 14,400 bps or higher, whereas the voice compression/decompression digital signal processor 214 is also a high performance digital signal processor capable of supporting a compression/decompression rate of 9600 bps.

The UART 201, the DAA 206, the CODEC 212, and the start up signal detection circuitry 210 are all intended to represent a broad category of these elements found in many DCEs. Similarly, the block transfer circuitry 203 is intended to represent a broad category of the element found in many computer systems. Their constitutions and functions are well known, and will not be further described.

Figure 1B:
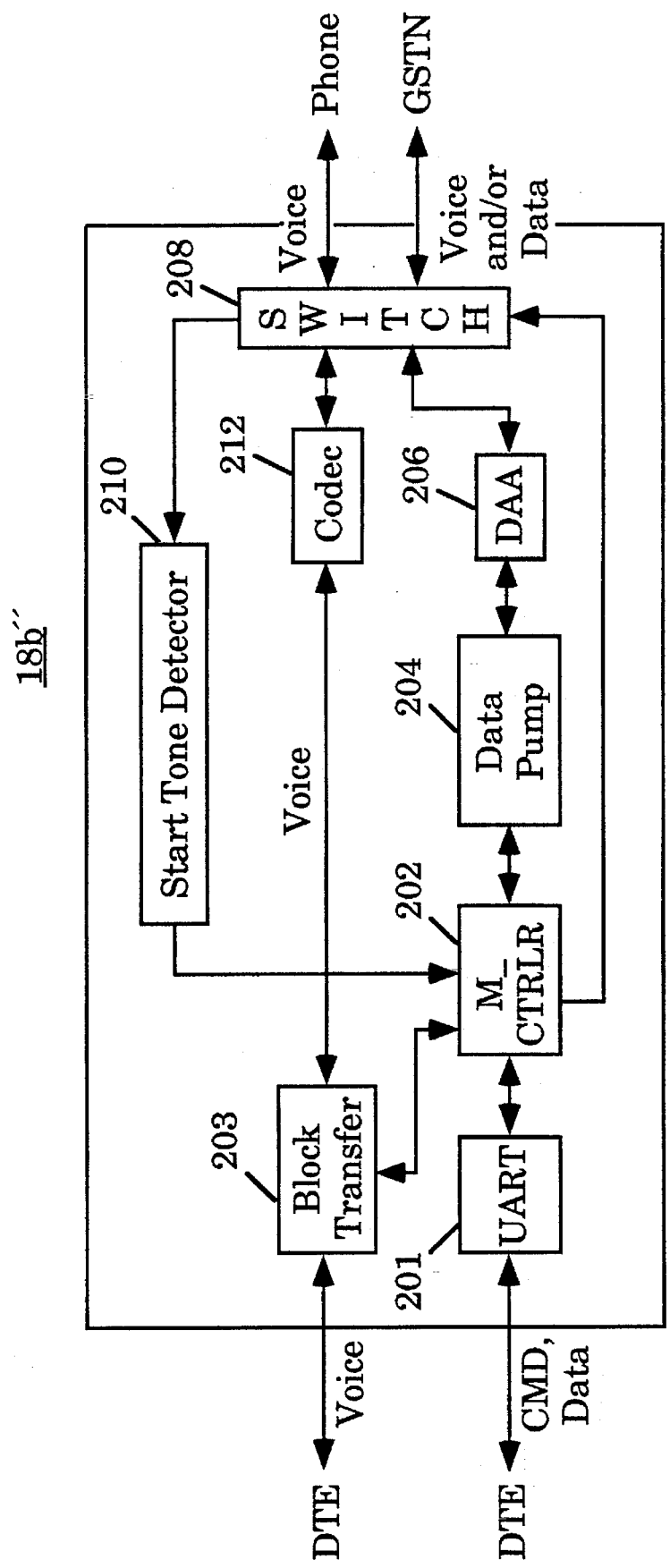
Figure 1C:
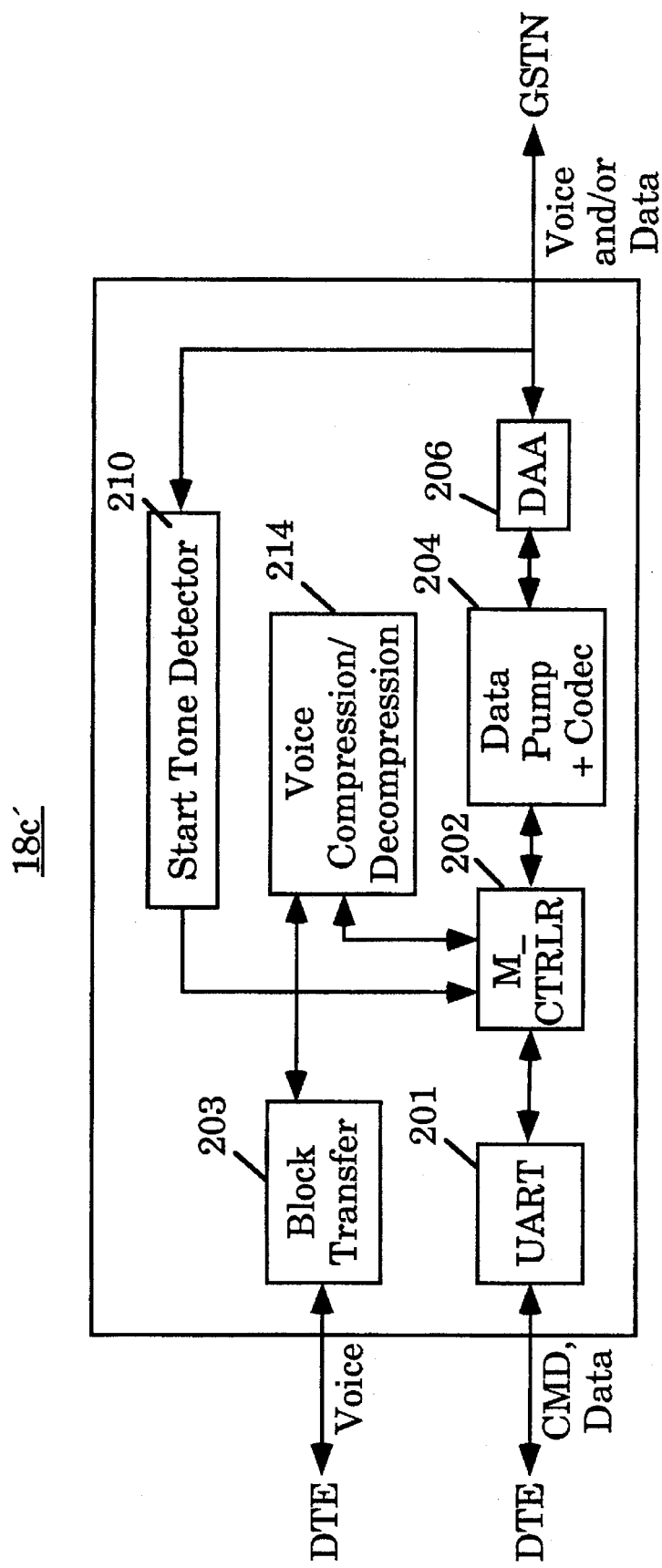
Figure 1D:
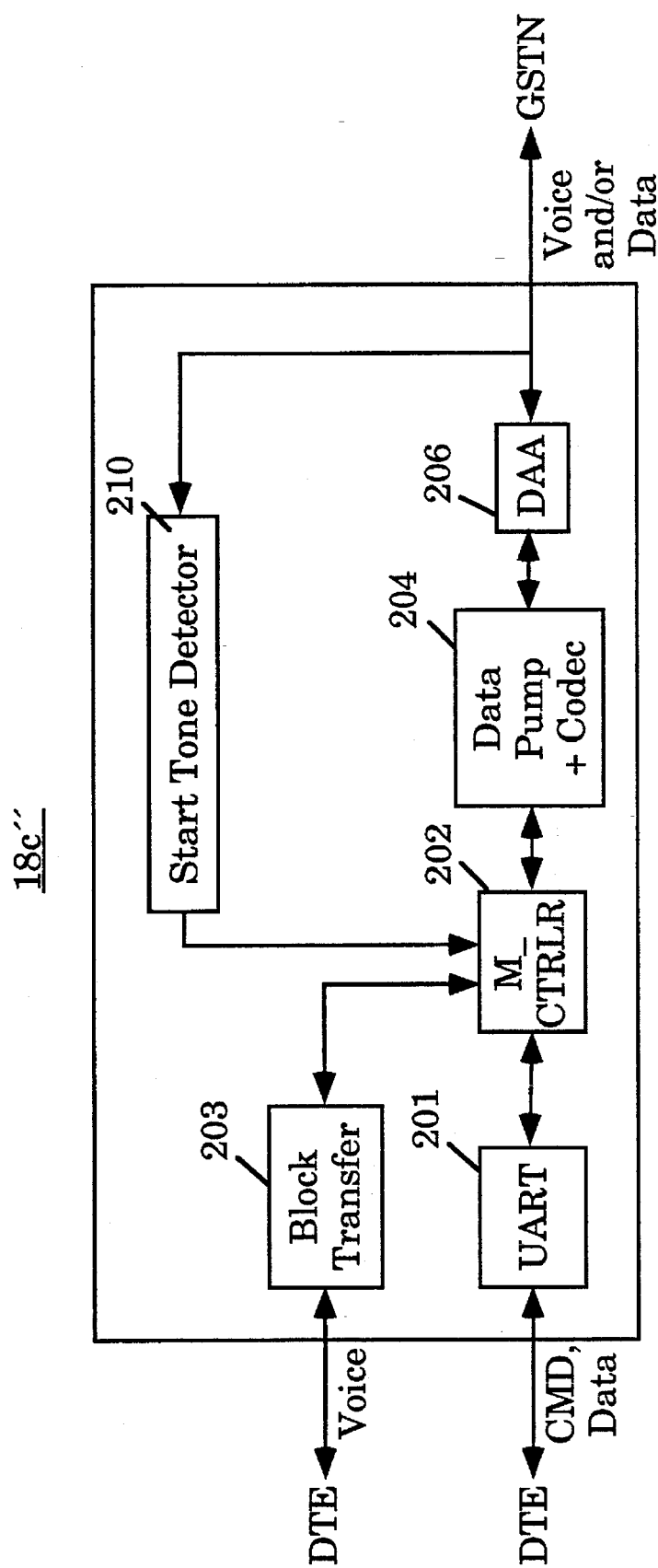
Figure 2A:
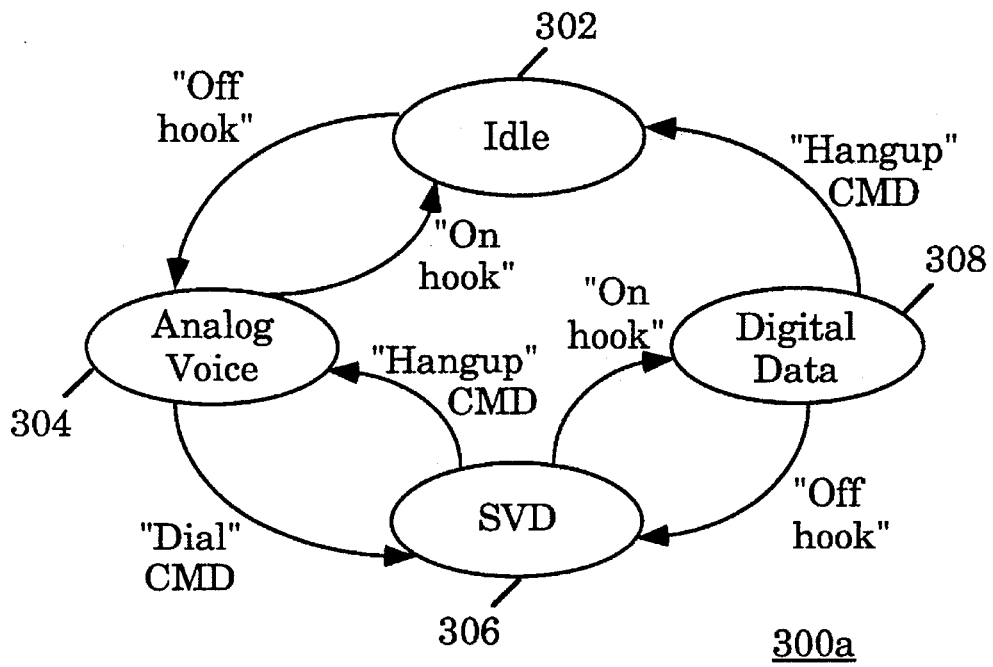
FIGS. 2a–2b illustrate the operating modes and mode transition rules of the enhanced micro-controllers of FIGS. 1a–1d responsive to various local events/commands or remote commands.
Figure 2B:
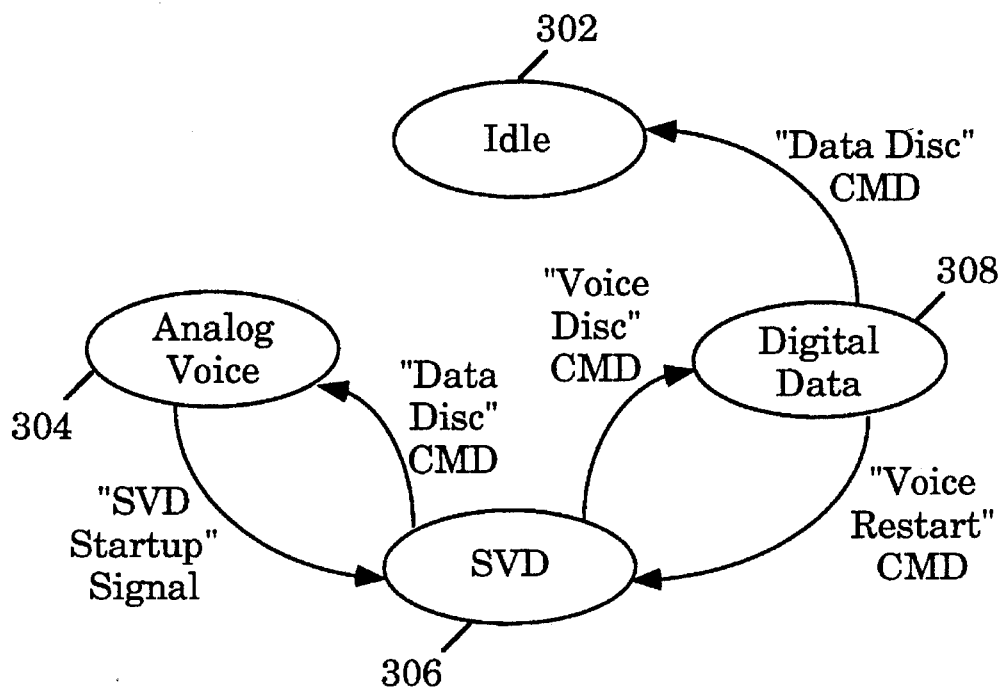

Referring now to FIGS. 2a–2b, two state diagrams illustrating the operating modes and transitional rules of the enhanced micro-controllers of FIGS. 1a–1d are shown. As illustrated, the enhanced micro-controller 202, responsive to local events or commands as well as remote commands, controls the operation of the DCE 18c', or 18c" in one of four modes, an idle mode 302, an analog voice mode 304, a digital data mode 308, and a simultaneous voice and data (SVD) mode 306.

In particular, during operation, as illustrated in FIG. 2a, from the analog voice mode 304, the micro-controller 202 of either a call originating or a call responding DCE 18a, 18b', 18b", 18c', or 18c" either returns the DCE 18a, 18b', 18b", 18c', or 18b" to the idle mode 302, upon detection of a local telephone being returned to an "on hook" condition from an "off hook" condition; or places the DCE 18a, 18b', 18b", 18c', or 18c", in the SVD mode 306, upon receipt of a "dial" command from a local DTE, and operates the DCE 18a, 18b', 18b", 18c', or 18c" accordingly. Under the SVD mode 306, the microcontroller 202 causes digitized voice as well as data to be exchanged with the other DCE 18a, 18b', 18b", 18c', or 18c" at the other end of the analog-loop telephone line.

Either the call originating or the call responding DCE 18a, 18b', 18b", 18c', or 18c" may receive the "dial" command from the local DTE. In other words, either the call originating or the call responding DCE 18a, 18b', 18b", 18c', or 18c" may initiate transitioning the call from the analog voice mode 304 to the SVD mode 306.

Additionally, during operation, as illustrated by FIG. 2b, from the analog voice mode 304, the micro-controller 202 of either the call originating or the call responding DCE 18a, 18b', 18b", 18c40, or 18c" places the DCE 18a, 18b', 18b", 18c', or 18c" in the SVD mode 306, upon detection of receiving a predetermined "start up" signal pattern from the other DCE 18a, 18b', 18b", 18c', or 18c" at the other end of the analog-loop telephone line connection, and operates the DCE 18a, 18b', 18b", 18c', or 18c" accordingly. Since either the call originating or the call responding DCE 18a, 18b', 18b", 18c', or 18c" may initiate the mode transition, the predetermined "start up" signal pattern receiving DCE 18a, 18b', 18b", 18c', 18c" may be either the call originating or the call responding DCE 18a, 18b', 18b ", 18c',or 18c"

For the embodiments illustrated in FIGS. 1a–1b, the "loop current detector" of the switching circuitry 208 is also used to detect the "on hook" and "off hook" conditions of the standalone telephone 20a. For the embodiments illustrated in FIGS. 1c–1d, the DTE simulates the "on hook" and "off hook" conditions of the integrated telephony circuitry 20b.

The manner in which the "dial" command is provided to the call originating or the call responding DCE 18a, 18b', 18b", 18c', or 18c" is protocol dependent. For example, under Telecommunication Industry Association (TIA) and Electronic Industry Association (EIA) 602 protocol, the "dial" command is provided by the "ATD" modem command.

The predetermined "start up" signal pattern unambiguously identifies to the mode transition responding DCE 18a, 18b', 18b", 18c', or 18c" the mode transition initiating DCE's desire to transition the call from the analog voice mode 304 to the SVD mode 306. The predetermined "start up"signal pattern is also protocol dependent. For examples, the predetermined "start up" signal pattern may be defined using ITU-T Recommendation V.25 or Draft Recommendation V.8 (see the corresponding ITU-T Recommendations for further details). As a further example, the predetermined "start up" signal pattern may be based on Bell Communication Research's (Bellcore) Analog Display Services Interface (ADSI) Customer Premises Equipment (CPE) Alerting Signal (see Bellcore publications TR-NWT-000030 and TR-NWT-001273 for further details).

In one embodiment, as will be described in more details below, the other DCE 18a, 18b', 18b", 18c', or 18c" confirms its support for SVD mode operation. Upon confirmation, as will be described in more details below, the mode transition initiating and responding DCEs 18a, 18b', 18b", 18c', or 18c" jointly establish multiple logical connections, and voice and data transmission protocols over these multiple logical connections. Upon establishing the logical connections and the transmission protocols, preferably the mode transition initiating as well as the responding DCE 18a, 18b', 18b", 18c', or 18c" multiplex voice and data onto the single analog-loop telephone line. Preferably, voice are transmitted without error correction at predetermined desired fix time intervals, whereas data are transmitted with error correction in between the fixed time intervals.

For further descriptions of the other non-SVD operating modes, the manners in which the DCE is operated in each of the other non-SVD operating modes, and other operating mode transitions, see the above identified and incorporated by reference U.S. patent application, Ser. No. 08/265,455. For further descriptions of multiplexing voice and data on an analog-loop telephone line, see U.S. patent application, Ser. No. 08/265,455, entitled Method and Apparatus for Multiplexing Voice and Data onto an Analog-Loop Telephone Line, which is hereby fully incorporated by reference.

Figure 3:
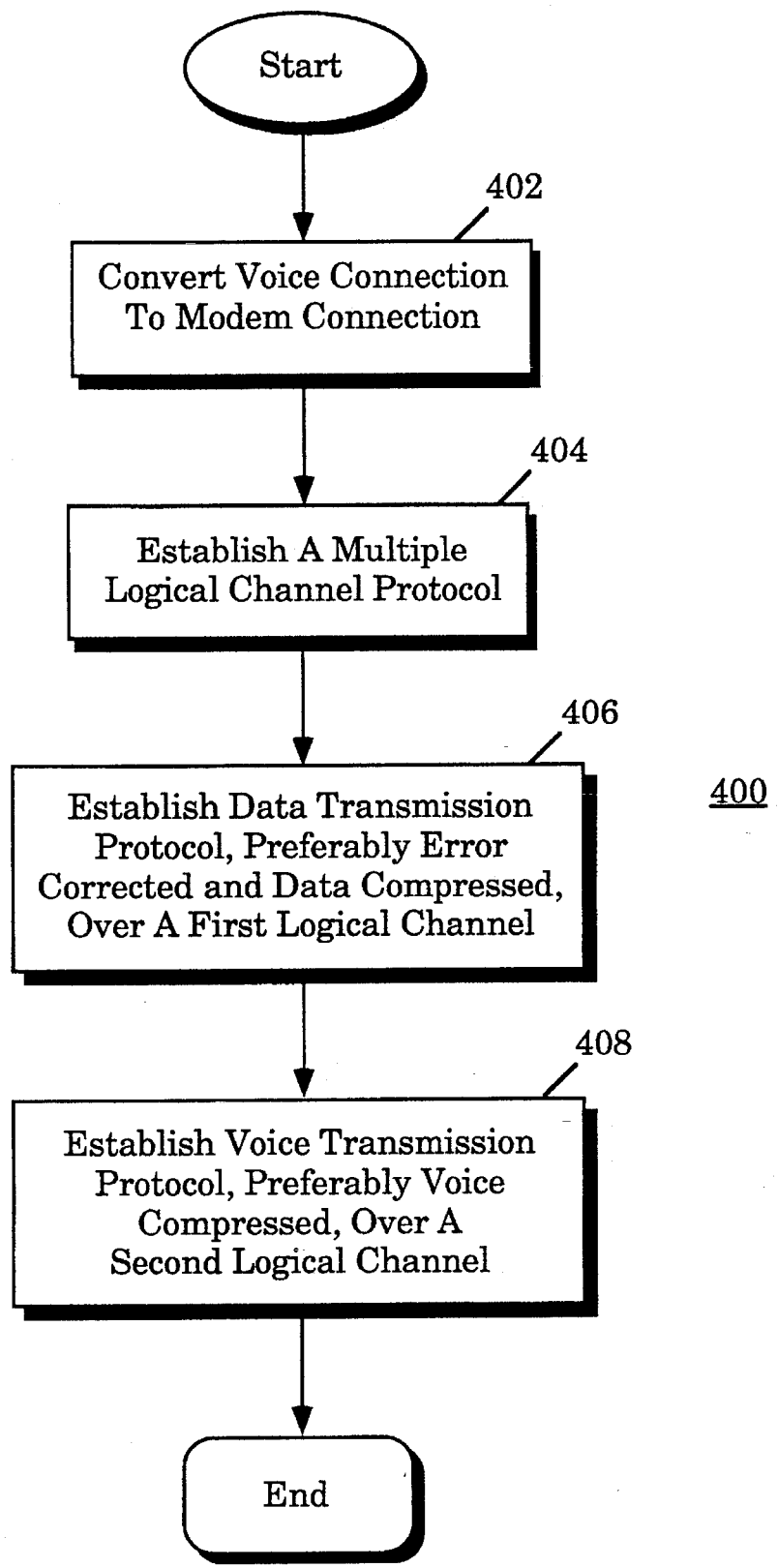
FIG. 3 illustrates the method steps of the present invention performed by the mode transition initiating and responding DCEs for converting a call from the analog voice mode to the SVD mode.

Referring now to FIG. 3, a block diagram illustrating the method steps of the present invention performed by the DCEs for converting a call from the analog voice mode to the SVD mode is shown. As illustrated, the mode transition initiating and responding DCEs 18a, 18b', 18b", 18c', or 18c" first cooperate to convert the voice connection to a modem connection, block 402. Next, the mode transition initiating and responding DCEs 18a, 18b', 18b", 18c', or 18c" then cooperate to establish a multiple logical channel protocol for the modem connection, block 404. The multiple logical channel protocol should have at least two logical channels, one for voice transmission and one for data transmission. Upon establishing the multiple logical channel protocol, the mode transition initiating and responding DCEs 18a, 18b', 18b", 18c', or 18c" cooperate to establish a data transmission protocol for the logical data channel(s), block 406. Preferably, the data transmission protocol is error corrected, and data compressed. Similarly, the mode transition initiating and responding DCEs 18a, 18b', 18b", 18c', or 18c" cooperate to establish a voice transmission protocol for the logical voice channel(s), block 408. Preferably, the voice transmission protocol is voice compressed. Although the present invention is being described with the data transmission protocol being jointly established before the voice transmission protocol, the present invention may be practiced with the order reversed.

In one embodiment, the mode transition initiating and responding DCEs 18a, 18b', 18b", 18c', or 18c" use the predetermined "start up" signal pattern and a predetermined "confirmation" to convert the voice connection to a modem connection, block 402. As described earlier, the predetermined "start up" signal pattern unambiguously identifies to the mode transition responding DCE 18a, 18b', 18b", 18c', or 18c", the mode transition initiating DCE's desire to transition the call from the analog voice mode 304 to the SVD mode 306. Conversely, the predetermined "confirmation" unambiguously confirms to the mode transition initiating DCE 18a, 18b', 18b", 18c', or 18c", the mode transition responding DCE's ability to support the SVD mode of operation.

Similar to the predetermined "start up" signal pattern, the predetermined "confirmation" is protocol dependent. For example, the predetermined "confirmation" may be complementarily defined using ITU-T Recommendation V.25 or Draft Recommendation V.8 (see the corresponding ITU-T Recommendations for further details). As a further example, the predetermined "confirmation" may also be complementarily based on Bellcore's ADSI Dual Tone Multifrequency (DTMF) confirmation signal (See also Bellcore publications TR-NWT-000030 and TR-NWT-001273 for further details).

Still referring to FIG. 3, in one embodiment, the mode transition initiating and responding DCEs 18a, 18b', 18b", 18c', or 18c jointly use V.42 detection phase to establish the multiple logical channel connection, block 404. Briefly, the mode transition initiating DCE 18a, 18b', 18b", 18c', or 18c (or the "calling" DCE as referred to by Recommendation V.42) repeatedly transmits a predetermined originator detection pattern (ODP) until the answerer detection pattern (ADP) is received or the detection phase timer expires. Concurrently, the mode transition responding DCE 18a, 18b', 18b", 18c', or 18c (or the "answering" DCE as referred to by Recommendation V.42) repeatedly transmits 1-bits (mark) and monitors for the ODP. The "answering" DCE 18a, 18b', 18b", 18c', or 18c" continues to transmit the 1-bit until either the ODP is received or expiration of the detection phase timer. Upon detection of the ODP, the "answering" DCE 18a, 18b', 18b", 18c', or 18c" transmits the ADP.

Upon detection of the ADP by the "calling" DCE 18a, 18b', 18b", 18c', or 18c", the multiple logical channel connection is established by virtue of the fact that both DCEs support the V.42 protocol which provides for multiple logical connections designated by Data Link Connection Identifiers (DCLIs). On the other hand, if ADP is not detected by the "calling" DCE 18a, 18b', 18b", 18c', or 18c" within the predetermined detection phase time interval, establishment of multiple logical channel connection has failed. In such event, the DCEs 18a, 18b', 18b", 18c', or 18c" would remain and continue to operate in the analog voice mode 302.

Note that each DCE 18a, 18b', 18b", 18c', or 18c" is also equipped with the capability to detect for start of protocol phase when acting in the role of an "answerer", in the event a connection attempt is being made by a DCE without the teachings of the present invention, such as a DCE that implements a non-error correcting transmission protocol. For further description of the detection phase of the V.42 recommendation, see also Volume III—Fascicle III.1 Data Communication Over The Telephone Network, Series V Recommendations published by the ITU-T.

Still referring to FIG. 3, in the above described V.42 embodiment, the "calling" and "answering" DCEs 18a, 18b', 18b", 18c', or 18c" jointly use V.42 protocol phase to establish the data transmission protocol for the logical data channel, block 406. Briefly, the "calling" and "answering" DCEs 18a, 18b', 18b", 18c', or 18c" use the exchange identification (XID) frames provided by Recommendation V.42 to negotiate and set the variable parameters. Optionally, the "calling" and "answering" DCEs 18a, 18b', 18b", 18c', or 18c" use the XID frames to negotiate and jointly establish data compression/decompression procedures provided by Recommendation V.42bis.

For further description of the protocol phase and XID frames of Recommendation V.42, see also Volume III-Fascicle III. 1 Data Communication Over The Telephone Network. Series V Recommendations published by the ITUT. For further description of the data compression/decompression procedures of the Recommendation V.42bis, see Data Communication Over The Telephone Network - Data Compression Procedures For Data Circuit Terminating Equipment (DCE) Using Error Correction Procedures, Recommendation V.42bis published by the ITU-T.

Still referring to FIG. 3, the "calling" and "answering" DCEs 18a, 18b', 18b", 18c', or 18c" also jointly use V.42's protocol phase to establish the voice transmission protocol for the logical voice channel, block 408. More specifically, the "calling" and "answering" DCEs 18a, 18b', 18b", 18c', or 18c" use the XID frames to negotiate and set the voice compression/decompression algorithm, and the voice blocking factor.

Figure 4:
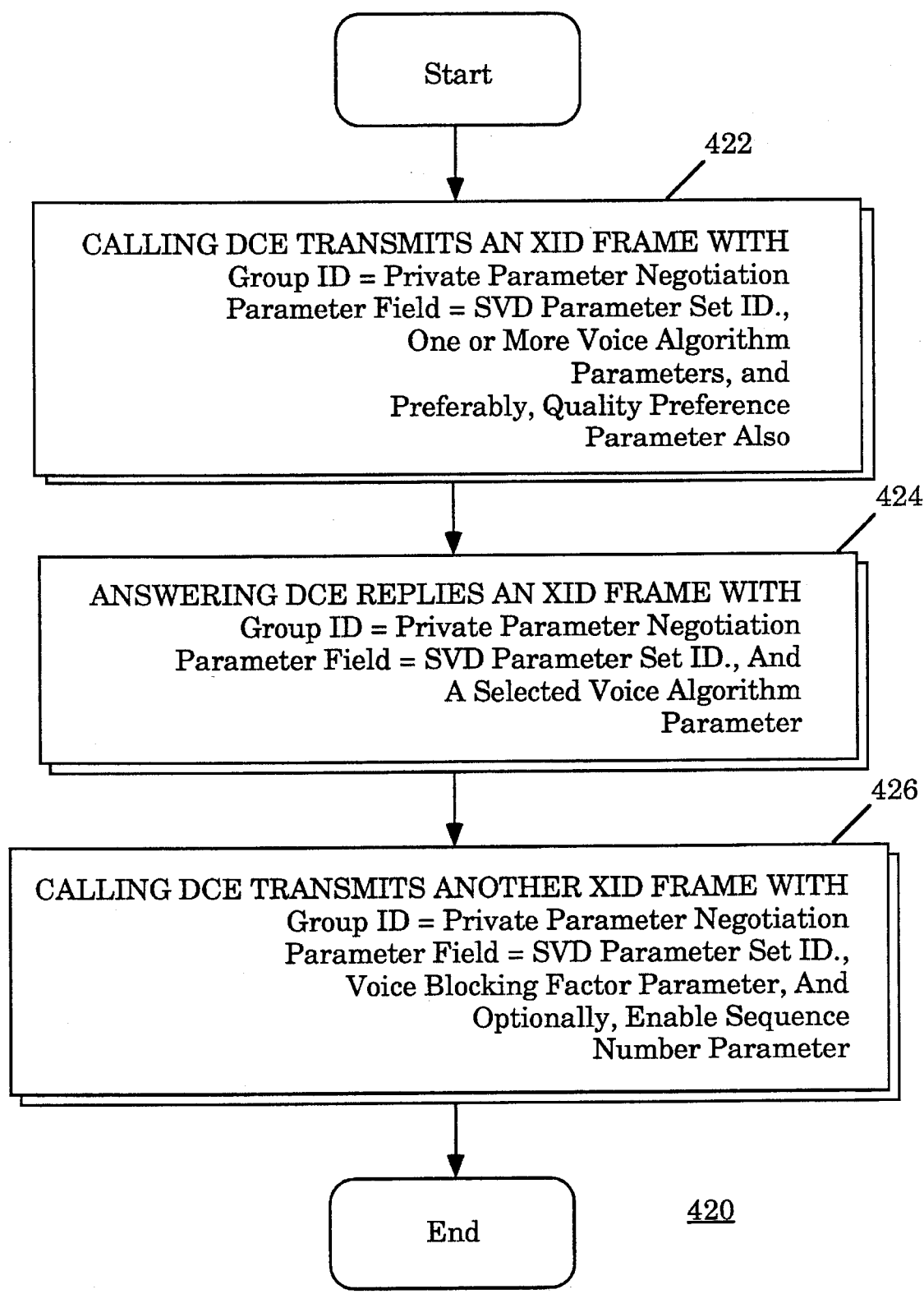
FIG. 4 illustrates the method steps employed by one embodiment of the enhanced micro-controllers of the mode transition initiating and responding DCEs for establishing a voice transmission protocol for the logical voice connection.

Referring now to FIG. 4, a block diagram illustrating the method steps employed by the above described V.42 embodiment of the enhanced micro-controllers of the "calling" and "answering" DCEs for establishing a voice transmission protocol for the logical voice connection is shown. As illustrated, the "calling" DCE 18a, 18b', 18b", 18c', or 18c" transmits an XID frame with the group identifier of the data link layer subfield set to private parameter negotiation, and the first parameter identifier of the parameter field of the data link layer subfield set to a predetermined SVD parameter set identifier, block 422. The "calling"DCE 18a, 18b', 18b", 18c', or 18c" nominates voice compression/decompression algorithms using additional parameters in the parameter field. The "calling" DCE 18a, 18b', 18b", 18c', or 18c" may nominate a manufacturer's voice compression/decompression algorithm if a manufacturer identifier has previously been supplied during the initial V.42 protocol establishment for the logical data connection. The "calling" DCE 18a, 18b', 18b", 18c', or 18c" may further supply a voice quality versus data rate tradeoff preference as another additional parameter in the parameter field.

The "answering" DCE 18a, 18b', 18b", 18c', or 18c" replies with an XID frame with the group identifier set to private parameter negotiation, the first parameter identifier set to a predetermined SVD parameter set identifier, and the second parameter identifier identifying the selected voice compression/decompression algorithm, factoring in its selection the voice quality versus data rate tradeoff preference if provided, block 424. Then, the "calling" DCE 18a, 18b', 18b", 18c', or 18c" determines the voice blocking factor based on the selected voice compression/decompression algorithm, and informs the "answering" DCE 18a, 18b', 18b", 18c', or 18c". The "calling " DEC 18a, 18b', 18b", 18c', or 18c" transmits another XID frame with the group identifier set to private parameter negotiation, the first parameter identifier set to a predetermined SVD parameter set identifier, and the second parameter identifier identifying the voice blocking factor, block 426. Optionally, the "calling" DCE 18a, 18b', 18b", 18c', or 18c" includes a third parameter identifying usage of frame sequence number is to enabled.

In one embodiment, the voice blocking factor is determined by dividing the time duration of the predetermined desired nominal fix interval for transmitting voice by the time duration of the smallest block of sampled voice that can be compressed by the selected voice compression/decompression algorithm. The time duration of the desired nominal fix interval is predetermined based on desired voice quality, principally but not exclusively, an user's perception of voice delay. For example, if the time duration of the predetermined desired nominal fix interval for transmitting voice is 60 ms, and the time duration of the smallest block of sampled voice that can be compressed by the selected voice compression/decompression algorithm is 30 ms, the voice blocking factor is two (60 ms divided by 30 ms).

Referring now to FIG. 5, a table illustrating exemplary voice parameters employed by the above described V.42 embodiment of the enhanced micro-controllers of the "calling" and "answering" DCEs for voice compression/decompression algorithm negotiation when establishing the voice transmission protocol is shown. As illustrated, there are seven exemplary voice parameters 432–444. The first exemplary voice parameter 432 is the parameter set identifier, which is set to a predetermined unique value denoting SVD parameter set. The second exemplary voice parameter 434 is the standard voice algorithm identifier which is set to a predetermined unique value denoting the standard voice algorithm. The third exemplary voice parameter 436 is the "calling" DCE's manufacturer specific voice algorithm identifier which is set to a predetermined unique value denoting the "calling" DCE's manufacturer specific voice algorithm. The fourth exemplary voice parameter 438 is the "answering" DCE's manufacturer specific voice algorithm identifier which is set to a predetermined unique value denoting the "answering" DCE's manufacturer specific voice algorithm. The fifth exemplary voice parameter 440 is the voice blocking factor for the HDLC frames which is set to a computed numeric value denoting the maximum number of voice frames per HDLC frame. The sixth exemplary voice parameter 442 is the frame sequence number enabling flag which is set to a predetermined setting denoting "enabling" if frame sequence number is to be started. Lastly, the seventh exemplary voice parameter 444 is the voice quality versus data rate preference indicator which is set to one of a number of predetermined indicator values denoting the "calling" DCE's preference.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. An improved micro-controller of a data circuit terminating equipment (DCE), wherein the improvements comprise:

(a) first control logic for transmitting to another DCE a first at least one information frame to nominate a plurality of voice compression/decompression algorithms to be used with a voice transmission protocol for transmitting voice between the two DCEs during operation, the other DCE being coupled to the DCE through an analog-loop telephone line, the first at least one information frame being transmitted to the other DCE in accordance to a frame based transmission protocol that provides for multiple logical channels, one of which is to be used for said voice transmissions;

(b) second control logic for determining a voice blocking factor for the voice transmission protocol responsive to a second at least one information frame containing a voice compression/decompression algorithm selection response from the other DCE to the voice compression/decompression algorithm nominations, said determination taking in account at least a first and a second timing factor, the first timing factor being a desired nominal fixed time interval for transmitting voice, and the second timing factor being amount of time required to compress/decompress a smallest block of sampled voice using the selected voice compression/decompression algorithm;

(c) third control logic for transmitting a third at least one information frame to the other DCE to inform the other DCE of the determined voice blocking factor; and (d) fourth control logic for initializing the DCE to transmit voice to the other DCE in accordance to the voice transmission protocol, using the selected voice compression/decompression algorithm and the determined voice blocking factor.

2. The improved micro-controller as set forth in claim 1, wherein the first control logic includes in the first at least one information frame a voice quality versus data rate preference in conjunction with the voice compression/decompression algorithm nominations to aid the other DCE in selecting one of the nominated voice compression/decompression algorithms.

3. The improved micro-controller as set forth in claim 1, wherein the improvements further comprise:

(e) operating logic for transmitting voice to the other DCE through one of the logical channels in accordance to the voice transmission protocol using the selected voice compression/decompression algorithm and the determined voice blocking factor.

4. An improved micro-controller of a data circuit terminating equipment (DCE), wherein the improvements comprise:

(a) first control logic for selecting a voice compression/decompression algorithm from a plurality of voice compression/decompression algorithms nominations contained in a first at least one information frame received from another DCE coupled to the DCE through an analog-loop telephone line, the first at least one information frame being transmitted from the other DCE to the DCE in accordance to a frame based transmission protocol that provides for a plurality of logical channels, the selected voice compression/decompression algorithm being used in association with a voice transmission protocol for subsequent transmission of voice between the two DCEs through one of the logical channels;

(b) second control logic for transmitting a second at least one information frame to the other DCE to inform the other DCE of the selected voice compression/decompression algorithm; and (c) third control logic for initializing the DCE to transmit voice to the other DCE in accordance to the voice transmission protocol using the selected voice compression/decompression algorithm and a voice blocking factor, responsive to receiving the voice blocking factor through a third at least one information frame from the other DCE.

5. The improved micro-controller as set forth in claim 4, wherein the first control logic, when making said selection, further factors into consideration a voice quality versus data rate preference received in conjunction with the voice compression/decompression algorithm nominations from the other DCE through said first at least one information frame.

6. The improved micro-controller as set forth in claim 4, wherein the improvements further comprise:

(d) operating logic for transmitting voice to the other DCE in accordance to the voice transmission protocol using the selected voice compression/decompression algorithm and the received voice blocking factor.

7. An improved data circuit terminating equipment (DCE), wherein the improvements comprise:

(a) a micro-controller having operating logic for operating the DCE in at least an analog voice mode or a simultaneous voice and data (SVD) mode during a call, and control logic for switching the DCE's operating mode from the analog voice mode to the SVD mode during the call including establishment of voice and data transmission protocols to be used by the operating logic while operating in the SVD mode, the control logic including (a.1) first logic for converting a voice connection over an analog-loop telephone line to another DCE to a modem connection, (a.2) second logic for establishing a transmission protocol for the modem connection with the other DCE, the transmission protocol being frame based and providing for at least a first and a second logical channels, (a.3) third logic for establishing a data transmission protocol for data transmission through the first logical channel, and (a.4) fourth logic for establishing a voice transmission protocol for voice transmission through the second logical channel, wherein when executed as a result of the first logic being an initiator of the conversion of the voice connection to the modem connection, the fourth logic transmits to the other DCE a first at least one information frame to nominate a first plurality of voice compression/decompression algorithms to be used with the voice transmission protocol for transmitting voice between the two DCEs through the second logical channel;

the fourth logic further determines a first voice blocking factor responsive to a second at least one information frame containing a response from the other DCE selecting a first voice compression/decompression algorithm, said determination taking into account at least a first and a second timing factor, the first timing factor being a desired nominal fixed time interval for transmitting voice, and the second timing factor being amount of time required to compress/decompress a smallest block of sampled voice using the first voice compression/decompression algorithm; and the fourth logic further transmits a third at least one information frame to inform the other DCE of the first voice blocking factor.

8. The improved DCE as set forth in claim 7, wherein the fourth logic further includes in the first at least one information frame a voice quality versus data rate preference in conjunction with the voice compression/decompression algorithm nominations to aid the other DCE in selecting one of the nominated voice compression/decompression algorithms.

9. The improved DCE as set forth in claim 7, wherein when executed as a result of the first logic being a responder of the conversion of the voice connection to the modem connection, the fourth logic selects a second voice compression/decompression algorithm among a second plurality of voice compression/decompression algorithms nominations contained in a fourth at least one information frame received from the other DCE, the fourth at least one information frame being transmitted in accordance to the frame based transmission protocol, the fourth logic further transmits a fifth at least one information frame to the other DCE to inform the other DCE of the selection of the second voice compression/decompression algorithm; and the fourth logic further receives a second voice blocking factor from the other DCE for use with the voice transmission protocol in conjunction with the second voice compression/decompression algorithm, the second voice blocking factor being determined and provided by the other DCE in response to the selection of the second voice compression/decompression algorithm.

10. The improved DCE as set forth in claim 9, wherein the fourth logic, when selecting the second voice compression/descompression algorithm, further factors into consideration voice quality versus data rate preference received in conjunction with the second plurality of voice compression/decompression algorithms nominations from the other DCE through said fourth at least one information frame.

11. A method for establishing a voice transmission protocol by a first data circuit terminating equipment (DCE) with a second DCE coupled to the first DCE, the method comprising the steps of:

a) transmitting to the second DCE by the first DCE a first at least one information frame to nominate a plurality of voice compression/decompression algorithms for use with a voice transmission protocol for transmitting voice between the DCEs, the first at least one information frame being transmitted in accordance with a frame based transmission protocol that provides for a plurality of logical channels, one of which is to be used for said voice transmissions;

b) determining by the first DCE a voice blocking factor for use with the voice transmission protocol, responsive to receiving a second at least one information frame containing a voice compression/decompression algorithm selection response from the second DCE, said determination taking into account at least a first and a second timing factor, the first timing factor being a desired nominal fixed time interval for transmitting voice, and the second timing factor being amount of time required to compress/decompress a smallest block of sampled voice using the selected voice compression/decompression algorithm; and c) transmitting a third at least one information frame by the first DCE to the second DCE to inform the second DCE of the determined voice blocking factor.

12. The method as set forth in claim 11, wherein, step (a) further includes including in said first at least one information frame a voice quality versus data rate preference with the voice compression/decompression algorithm nominations to aid the second DCE in making the selection.

13. A method for establishing a voice transmission protocol by a first data circuit terminating equipment (DCE) with a second DCE, the method comprising the step of:

(a) receiving by the first DCE from the second DCE a first at least one information frame containing a plurality of voice compression/decompression algorithm nominations for use with a voice transmission protocol for transmitting voice between the DCEs, said first at least one information frame being transmitted in accordance to a frame based transmission protocol that provides for a plurality of logical channels, one of which is to be used for said voice transmissions;

(b) selecting one of the nominated compression/decompression algorithms by the first DCE;

(c) transmitting a second at least one information frame by the first DCE to the second DCE to inform the second DCE of the selection; and (d) receiving by the first DCE from the second DCE a third at least one information frame containing a voice blocking factor for use with the voice transmission protocol, said voice block factor being determined and provided in response to said voice compression/decompression algorithm selection.

14. The method as set forth in claim 13, wherein, step (a) further comprises including in the first at least one information frame by the first DCE a voice quality versus data rate preference in with the voice compression/decompression algorithm nominations; and the selection in step (b) by the first DCE is made factoring in the voice quality versus data rate preference received from the second DCE.

15. A method for converting a multi-modal voice, data, or voice and data call over a single analog-loop telephone line between two data circuit terminating equipments (DCEs) from an analog voice mode to a simultaneous voice and data (SVD) mode during a call, the method comprising the steps of:

(a) the two DCEs jointly converting a voice connection over the telephone line between each other over which the call is being conducted into a modem connection;

(b) the two DCEs jointly establishing with each other a frame based transmission protocol for the modem connection, the frame based transmission protocol providing for at least a first and a second logical channel;

(c) the two DCEs jointly establishing a data transmission protocol for transmitting data over the first logical channel; and (d) the two DCEs jointly establishing a voice transmission protocol for transmitting voice over the second logical channel, including (d.1) a first of the two DCEs transmitting to a second of the DCEs a first at least one information frame of the frame based transmission protocol to nominate a plurality of voice compression/decompression algorithms for use with the voice transmission protocol for transmitting voice between the two DCEs through the second logical channel;

(d.2) the first DCE determining a voice blocking factor for the voice transmission protocol based on a response contained in a second at least one information frame received from the second DCE identifying a selected voice compression/decompression algorithm, said determination factoring into account a first and a second timing factor, the first timing factor being a desired nominal fixed time interval for transmitting voice, and the second timing factor being amount of time required to compress/decompress a smallest block of sampled voice using the selected voice compression/decompression algorithm; and (d.3) the first DCE transmitting to the second DCE a third at least one information frame to inform the second DCE of the determined voice block for the voice transmission protocol.

16. The method as set forth in claim 15, wherein step (d.1) further includes the first DCE including in said first at least one information frame a voice quality versus data rate preference with the voice compression/decompression algorithm nominations to the second DCE.

17. The method as set forth in claim 15, wherein step (d.1) includes the second DCE selecting the selected voice compression/decompression algorithm from the number of voice compression/decompression algorithms nominations contained in the first at least one information frame, and the second DCE transmitting the second at least one information frame to inform the first DCE of the selected voice compression/decompression algorithm; and step (d.3) includes the second DCE receiving the third at least one information frame containing the determined voice blocking factor for use with the voice transmission protocol.

18. The method as set forth in claim 17, wherein step (d.1) further includes the second DCE, when making the selection, factoring into consideration a voice quality versus data rate preference received in conjunction with the voice compression/decompression algorithms nominations from the second DCE, through the first at least one information frame.

* * * * *

UNITED STATES PATENT AND TRADEMARK OFFICE
CERTIFICATE OF CORRECTION

PATENT NO. : 5,606,599
DATED : February 25, 1997
INVENTOR(S) : O'Mahony et al.

It is certified that error appears in the above-identified patent and that said Letters Patent is hereby corrected as shown below:

In column 1 at line 55 delete "par" and insert --part--

In column 1 at line 60 delete "star" and insert --start--

In column 5 at line 1 delete "8" and insert --18--

In column 5 at line 5 insert --18a,-- following "DCE" and prior to "18b',"

In column 5 at line 42 delete insert --18a, 18b', 18b",-- following "DCE" and prior to "18c',"

In column 6 at line 2 delete "18c40" and insert --18c'--

In column 9 at line 16 delete "DEC" and insert --DCE--

In column 13 at line 46 delete "in"

UNITED STATES PATENT AND TRADEMARK OFFICE
CERTIFICATE OF CORRECTION

PATENT NO. : 5,606,599　　　　　　　　　　　　Page 2 of 2
DATED     : February 25, 1997
INVENTOR(S) : O'Mahony et al.

It is certified that error appears in the above-indentified patent and that said Letters Patent is hereby corrected as shown below:

In column 13 at line 46 delete "in"

Signed and Sealed this

Twelfth Day of August, 1997

Attest:

BRUCE LEHMAN

Attesting Officer　　　　　Commissioner of Patents and Trademarks